Dec. 13, 1960  E. S. HEBELER  2,964,727
CABLE CONNECTIONS
Filed Aug. 5, 1957  2 Sheets-Sheet 1
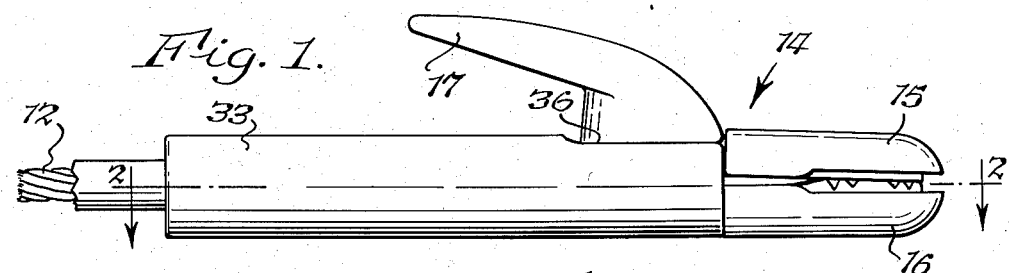
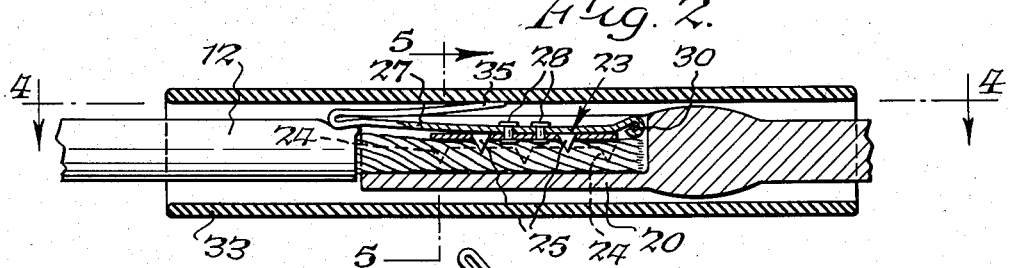
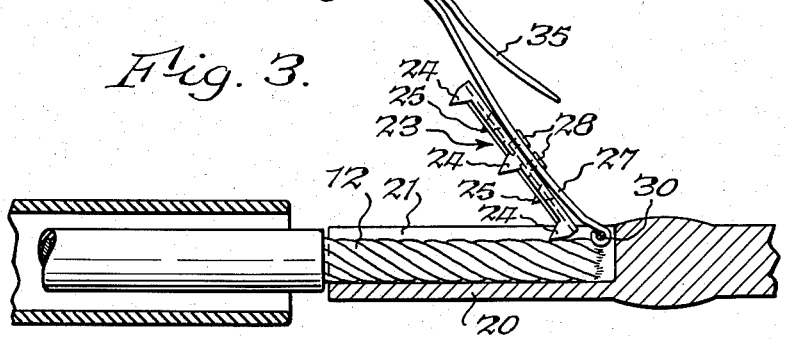
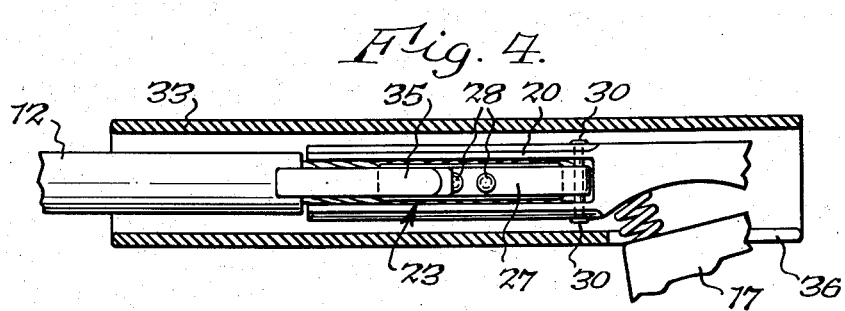
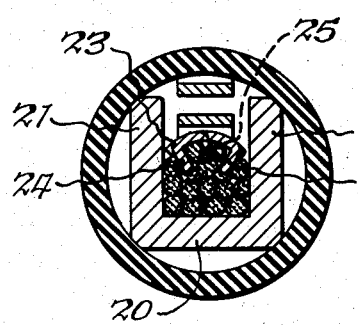
INVENTOR.
Edward S. Hebeler
BY
Attorney.

Dec. 13, 1960
E. S. HEBELER
2,964,727
CABLE CONNECTIONS
Filed Aug. 5, 1957
2 Sheets-Sheet 2
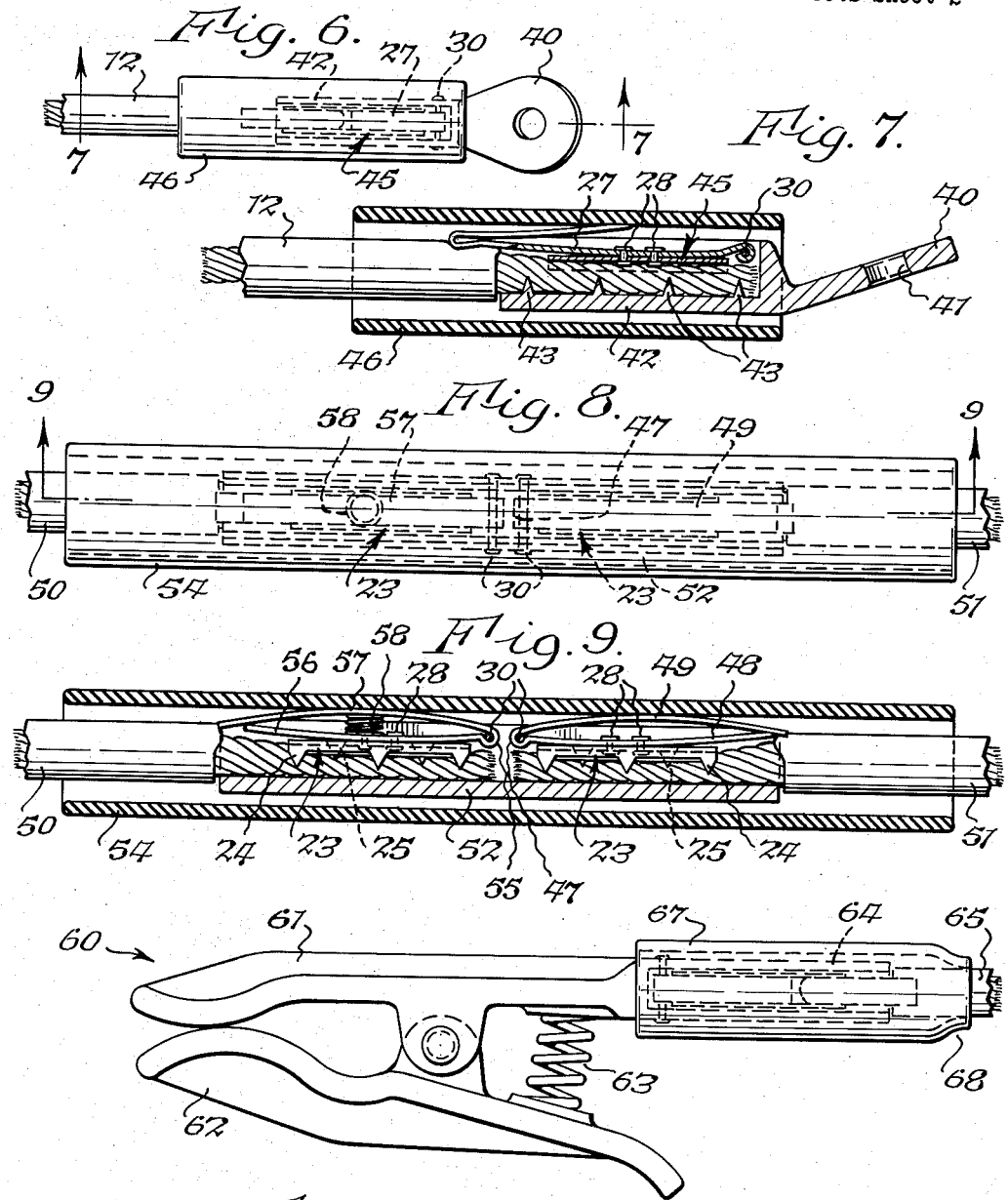
INVENTOR.
Edward S. Hebeler
BY
Parker & Vinson
Attorneys.

United States Patent Office 2,964,727
Patented Dec. 13, 1960

2,964,727

CABLE CONNECTIONS

Edward S. Hebeler, 137 Evans St., Williamsville, N.Y.

Filed Aug. 5, 1957, Ser. No. 676,232

4 Claims. (Cl. 339—213)

This invention relates to improvements in connections for electrical conducting cables for the purpose of connecting the ends of two cables to each other, for connecting a cable to a welding electrode holder or a ground clamp or terminal lug.

Electric welding apparatus has been constructed to carry more electricity than was formerly used which consequently necessitates the use of larger cables. Because of the weight of copper, these cables are frequently made of aluminum wire. Aluminum has a higher coefficient of expansion than copper and is also considerably more difficult to solder. It is therefore common practice to use cable connections in which the contacts are secured together by means of clamps in which screws are commonly used to apply pressure against the cable ends. However, since these cables are made of a large number of small wires when they are heated at the contacts, or flexed, they expand and frequently change their positions relatively to each other so that when the wires again become cooled, they are not clamped as tightly as originally. Furthermore, aluminum is quite subject to oxidation, particularly when heated, and when this occurs the clamped connections do not provide as good conductivity as they did before oxidation took place. Consequently this results in higher resistance at the clamped parts of the connection which, in turn, results in higher temperatures, further oxidation, etc., so that eventually the connection may become seriously damaged by heat. If this connection is on the electrode holder, the holder becomes heated so that it is uncomfortable for the operator.

In order to overcome this condition, the clamps securing the ends of the cables to other conducting parts have heretofore been backed by spring pressure so that if the wires of a cable become rearranged, due to heat, or for other reasons, such, for example, as pulls exerted on the cables, the spring pressure immediately adjusts itself to the change in shape of the cable, thus continuing to press together all strands of wires of the cable together and into contact with parts of the connectors to produce good low resistance contacts between the parts of the cables and other conductors. Connections of this general type are shown in my Patents No. 2,547,080 of April 3, 1951 and No. 2,753,392 of July 3, 1956.

One of the objects of this invention is to provide cable connections of the type in which spring pressure is used to reduce heating of the cable at the connection, and in which the parts of the connection are so formed that they may be easily assembled and taken apart.

Another object is to provide cable connections of this type in which the parts of the connectors are movably connected with each other so that the parts of the connectors will not be apt to become lost or misplaced and so that they will be held in their correct positions to facilitate the applications of the connectors to the cable ends and so that they will prevent movement of the cable gripping members relatively to each other.

Other objects and advantages will be apparent from the following description of some embodiments of the invention, and the novel features will be particularly pointed out hereinafter in connection with the appended claims.

In the accompanying drawings:

Fig. 1 is a side elevation of an electrode holder provided with a cable connection embodying this invention.

Fig. 2 is a central sectional view thereof on lines 2—2, Fig. 1.

Fig. 3 is an elevation, partly in section, showing the parts of the cable connection separated before being placed into their operative relations to each other.

Fig. 4 is a sectional plan view thereof on line 4—4, Fig. 2.

Fig. 5 is a transverse, sectional view thereof on an enlarged scale on line 5—5, Fig. 2.

Fig. 6 is a view of a terminal lug connected with a cable by means of my improved cable connections.

Fig. 7 is a central sectional view thereof on an enlarged scale on line 7—7, Fig. 6.

Fig. 8 is a view of a cable connector having means of modified construction for connecting the ends of two cables in accordance with my invention.

Fig. 9 is a sectional view thereof on line 9—9, Fig. 8.

Fig. 10 is a view of a ground clamp connected with a cable by means of a cable connection embodying this invention.

Referring to Figs. 1–5, 12 represents a cable of any suitable type covered with the usual insulating material, and 14 represents an electrode clamp to which a cable is connected. The electrode holder shown has a pair of jaws 15 and 16 between which an electrode or welding rod may be gripped, the jaw being movable by actuation of a handle 17.

In order to connect the electrode holder with the cable 12, the stationary jaw 16 of the electrode holder is provided with an electricity conducting member which in the particular construction shown is in the form of a channel or trough-shaped extension 20 which extends rearwardly from the jaw and which is of such size as to receive the conductors of a cable 12 after the insulation has been removed therefrom. This channel-shaped portion has a bottom wall formed integral with side walls 21 which confine the wires of the cable and limit the spreading of the same outwardly when pressure is applied to the cable through the open end of the channel 20. This pressure is applied by means of a combined pressure and gripping member 23 which is of such width as to fit within the channel member 20 and is also provided with a plurality of prongs or projections 24 which may be formed integral therewith by bending portions of the sides of the pressure member toward one side of the body portion thereof so that when the pressure member is inserted into the channel 20, these prongs or projections will penetrate the cable end, which is arranged within the channel member 20. The pressure member may also have portions 25 formed by pressing integral parts of the middle part of the pressure member downwardly so as to project into the cable when the pressure member is forced into engagement with the same through the open end of the channel member 20.

Because of the tendency of the wires of the cable to shift relatively to each other and relatively to the channel member 20, due to heat or pull exerted on the cable 12, yielding means are employed to urge the pressure member against the cable end. In the particular construction shown for this purpose, I have provided a leaf spring member 27 to which the pressure member may be attached in any suitable manner, for example, by means of rivets 28 extending through the spring and pressure member 23. The portion of the spring 27 adjacent the pressure member is bowed so that the spring extends away from the pressure member at opposite sides of the rivets or other fastening devices 28.

In order to prevent any pull on the cable from permitting the pressure member together with the spring from being drawn out from the conducting member 20, I provided means for securing the spring against such endwise movement in this member. It is also desirable to provide a connection between this member and the spring by means of which the spring will be held on the channel to avoid loss or misplacing of the same. For this purpose I provide one end of the spring 27 with a loop which extends about a pin 30 preferably made of insulating material and secured to the channel and extending across and secured to the opposite sides 21 thereof, for example, by providing heads or enlargements on the opposite ends of the pin as clearly shown in Fig. 4.

It is customary to provide the electrode holder with a grip or handle which is preferably made of insulating material. I preferably employ a tube or sleeve 33 of insulating material for the two-fold purpose of providing a handle for the electrode holder and also for compressing the spring 27. This tube or sleeve is of such diameter that when the spring 27 is swung downwardly from the position shown in Fig. 3, the tube or sleeve may be passed over the spring and thus hold the spring in its position to press against the pressure member 23. The spring is also preferably provided at its outer end with an arm or integral extension 35 which normally extends outwardly from the body portion of the spring 27, as clearly shown in Fig. 3. This extension of the spring makes it possible to use my improved cable connector with cables of materially smaller size relatively to the channel than that shown in the drawings and also increases the resilience of the spring. This is important in connection with aluminum cables which have a greater coefficient of expansion, and consequently require greater travel of the compression member. When it is desired to clamp the cable end in the channel or conducting member 20, this spring is pressed downwardly toward the channel so as to extend into the tube of sleeve 33 when the same is moved to the right from the position shown in Fig. 3 to that shown in Figs. 1 and 2. The parts will then occupy the positions shown in Fig. 2, in which the spring will urge the compression member against the cable end and cause the projections to enter between the strands of the cable and thus firmly grip the cable. If any pull is exerted on the cable in a direction to slide the cable end out of the channel, this pull will be resisted by the pivot pin 30 and by the engagement of the prongs or projections 24 and 25 against the strands of the cable. Therefore, it is not ordinarily necessary to provide any inward prongs or projections on the walls of the channel, but it will be understood that such projections, prongs, burrs or the like, not shown, may be used if desired.

The sleeve or tube 33 may be provided at one end with a recess or cutout portion 36, Fig. 4, which is of such size as to permit part of the lever 17 of the electrode holder to extend into the same, thus permitting the tube to completely cover all parts of the cable connection. At the other end the tube may be of reduced diameter to fit more closely about the cable 12.

In Figs. 6 and 7 I have shown my improved cable connection applied to a terminal lug, whereby a cable may be connected to a generator or other current conducting member. 40 represents a terminal lug of this type which is provided with the usual aperture 41. In accordance with my invention I provide this terminal lug with a channel shaped electricity conducting member 42 which may be identical with that shown in Figs. 1–5, except that, by way of example, this channel is provided with inwardly extending prongs or projections 43 formed to enter into the bare end of the cable 12 when the same is inserted into the channel 42. Also the construction of the pressure member 45 is similar to that shown in Figs. 1–5 except that it is not provided with any prongs or projections for the reason that they are provided on the channel 42 and therefore are not needed on the pressure member. It will be obvious that the arrangement of the prongs or projections shown in Figs. 1–5 may be as shown in Figs. 6 and 7, or if desired prongs or projections may be employed on both the channel and the pressure member in all forms of my cable connections. This pressure member is connected with a spring 27 identical with that shown in Figs. 1–5, which is held on the channel or conducting member 42 by means of the pivot pin 30.

The parts are formed to cooperate with a tube or sleeve 46 of any suitable material, the springs serving to urge the pressure member into the channel which, in turn, causes the wires of the end of the cable to be pressed into engagement with the prongs or projections 43 of the channel member 42. The operation of the cable connection is the same as that described in connection with Figs. 1–5.

In Figs. 8 and 9 I have provided a cable connector for use in connecting the ends of two cables 50 and 51. In this case an elongated electricity conducting member 52 which may be of channel or trough shape is provided which is of sufficient length to engage the ends of two cables without having them overlap. The pressure member 23 may be identical with that shown in Figs. 1–5 and a tube or sleeve 54 of insulating material is employed to compress the springs as in the case of the constructions shown in the preceding figures, the tube preferably being made long enough to cooperate with both springs. However, if desired, the tube may be made in two separate halves, one for each spring and arranged to abut in a plane adjacent to the ends of the two cables 50 and 51.

In order to further illustrate my invention I have shown spring members of modified construction for each cable end. The spring member at the right hand side of Fig. 9 being made of a spring metal strip bent intermediate of its ends to form a loop 47 extending about the pin 30, and two legs 48 and 49, the inner leg 48 bearing against the cable end or against a gripping and pressure member 23, if one is used and the other leg extends outwardly in position to be pressed toward the cable end by the tube 54. The outer leg 49 is made slightly longer than the leg 48 so that its free end overlaps the adjacent end of the leg 48. Consequently when the tube 54 is passed over the leg 49, this leg on being deflected inwardly is free to slide on the end of the leg 48.

At the left of the connection a spring member is provided of a shape similar to the spring member shown at the right, but this member need not be made of a spring metal, but may be of a plastic or other insulating or non-metallic material. This member has a loop 55 extending about the pin 30 and two legs 56 and 57 shaped like the legs 48 and 49. The two legs 56 and 57 may be forced outwardly by any suitable means, such for example as a coil spring 58 which will be compressed when the leg 57 is pressed inwardly by the tube 54.

In Fig. 10 I have shown my improvements applied to a ground clamp 60 which comprises a stationary jaw 61 and a movable lever 62 urged by a spring 63 to move the other end of the lever 62 toward the end of the jaw 61. This stationary jaw 61 is provided with an integrally formed channel of trough member 64 shown in broken lines in Fig. 10, into which an end of a cable 65 may be placed and into which it is pressed by constructions identical with those disclosed in the preceding figures, the spring being pressed into its operative position by means of a sleeve or tube 67 which, in this case, may be made of metal. The outer end of the sleeve 67 is contracted at 68 to fit the cable 65 more closely, and it will be understood that the outer ends of the sleeves shown in the other figures may be similarly contracted if desired. In Figs. 8 and 9 it will be understood that the contracted ends of the tubes can only be employed if the tube 54 is made in two parts, as stated.

The troughs or channel members of my connections herein described must of course be made of a material which is a good conductor of electricity, but the sleeves or tubes may be made of metal or of insulating material, depending upon the intended use of the cable connection.

These cable connections are commonly used in connection with cables for supplying current to electric welding apparatus, but it is not intended to limit the invention to such use.

It will be understood that various changes in the details, materials and arrangements of parts, which have been herein described and illustrated in order to explain the nature of the invention, may be made by those skilled in the art within the principle and scope of the invention as expressed in the appended claims.

I claim:

1. A cable connection including a channel shaped member of electricity conducting material having sides between which an end of a cable may be placed, a compression member shaped to fit between said sides of said channel shaped member, a spring secured to said compression member intermediate of the ends thereof, a pivot extending across said channel shaped member and having its ends secured to the sides thereof, one end of said spring member being formed to fit around said pivot to enable said spring to move into and out of said channel, and a tube extending about said members and engaging the other end of said spring for urging the same against said compression member.

2. A cable connection including a trough-shaped member of electricity conducting material for receiving an end of a cable, a compression member shaped to fit into said trough-shaped member to engage the part of the cable arranged therein, a spring having one end movably connected with said trough-shaped member and secured to said compression member intermediate of the ends thereof, the other end of said spring having a portion bent back on itself, and a tube extending about said members and engaging said bent back portion of said spring for urging said spring and said compression member into said trough-shaped member.

3. A cable connection including a trough-shaped member of electricity conducting material for receiving an end of a cable, a compression member shaped to fit into said trough-shaped member to engage the part of the cable arranged therein, a spring member having two legs one of which is secured to said compression member and the other of which extends outwardly from said one leg, means engaging the other leg for urging the same toward said compression member for yieldingly pressing said cable end against said trough-shaped member.

4. A cable connection according to claim 3 and including a coil spring interposed between the legs of said spring member and urging said legs apart.

References Cited in the file of this patent

UNITED STATES PATENTS

| 1,666,991 | Cohen | Apr. 24, 1928 |
| 2,235,545 | Young | Mar. 18, 1941 |
| 2,650,948 | Findlay | Sept. 1, 1953 |
| 2,753,392 | Hebeler | July 3, 1956 |

FOREIGN PATENTS

| 246,660 | Great Britain | Feb. 4, 1926 |